(12) United States Patent
Fawaz et al.

(10) Patent No.: US 9,916,408 B2
(45) Date of Patent: Mar. 13, 2018

(54) CIRCUIT DESIGN GENERATOR

(71) Applicants: Khodor Fawaz, Edinburgh (GB); Seyed Mohammadali Eslami, London (GB)

(72) Inventors: Khodor Fawaz, Edinburgh (GB); Seyed Mohammadali Eslami, London (GB)

( * ) Notice: Subject to any disclaimer, the term of this patent is extended or adjusted under 35 U.S.C. 154(b) by 233 days.

(21) Appl. No.: 14/822,880

(22) Filed: Aug. 10, 2015

(65) Prior Publication Data
US 2016/0042107 A1 Feb. 11, 2016

(30) Foreign Application Priority Data
Aug. 11, 2014 (GB) .................................. 1414230.1

(51) Int. Cl.
*G06F 17/50* (2006.01)

(52) U.S. Cl.
CPC ........ *G06F 17/5045* (2013.01); *G06F 17/505* (2013.01); *G06F 17/5054* (2013.01); *G06F 17/5068* (2013.01); *G06F 17/5072* (2013.01); *G06F 17/5081* (2013.01); *G06F 2217/08* (2013.01)

(58) Field of Classification Search
None
See application file for complete search history.

(56) References Cited

U.S. PATENT DOCUMENTS

| 4,967,367 | A | * | 10/1990 | Piednoir | G06F 17/5068 716/102 |
|---|---|---|---|---|---|
| 5,276,855 | A | | 1/1994 | Kitahara | |
| 7,620,924 | B2 | * | 11/2009 | Delp | G06F 17/505 326/37 |
| 8,006,220 | B2 | * | 8/2011 | McConaghy | G06F 17/5063 716/100 |
| 8,046,727 | B2 | * | 10/2011 | Solomon | G06F 17/5045 326/101 |
| 8,489,855 | B2 | * | 7/2013 | Schuette | G06F 3/0616 707/693 |
| 8,976,609 | B1 | * | 3/2015 | Frayer | G11C 29/006 324/754.01 |
| 2006/0236292 | A1 | | 10/2006 | Delp et al. | |
| 2011/0093827 | A1 | * | 4/2011 | Tsurusaki | G06F 17/5031 716/113 |

FOREIGN PATENT DOCUMENTS

WO 2006114642 A1 11/2006

OTHER PUBLICATIONS

Esmaeilzadeh et al. Power Challenges May End the Multicore Era, Communications of the ACM, Feb. 2013, vol. 56 No. 2, pp. 93-402.
Fawaz, A Dynamically Reconfigurable Asynchronous Processor, The University of Edinburgh, Aug. 2011 pp. 28-39.
(Continued)

*Primary Examiner* — Leigh Garbowski
(74) *Attorney, Agent, or Firm* — Lodestone Legal Group; Jeromye V. Sartain

(57) ABSTRACT

Systems and methods for designing reconfigurable integrated circuits receive target data and training data; and generate a circuit design for implementing the target data which is over-provisioned with respect to the target data according to the training data.

20 Claims, 14 Drawing Sheets

(56) References Cited

OTHER PUBLICATIONS

Huang et al. Maximum Likelihood Graph Structure Estimation with Degree Distributions, ResearchGate, Retrieved on: Aug. 10, 2015 http://www.researchgate.net/publication/228699578 , pp. 1-6.
Khawam et al., the Reconfigurable Instruction Cell Array, IEEE Transactions on Very Large Scale Integration (VLSI) Systems, vol. 16 No. 1, Jan. 2008 , pp. 75-85.
UK Intellectual Property Office Search Report, GB1414230.1, dated Feb. 18, 2015.
Zain-Ul-Abdin et al., Evolution in Architectures and Programming Methodologies of Coarse-Grained Reconfigurable Computing, Microprocessors and Microsystems 33 (2009) 161-178.

* cited by examiner

CIRCUIT DESIGN GENERATOR

RELATED APPLICATIONS

This application claims priority under 35 U.S.C. §119 and is entitled to the filing date of UK patent application GB 1414230.1 filed on Aug. 11, 2014. The contents of the aforementioned application are incorporated by reference herein.

BACKGROUND

The present disclosure relates to a circuit design generator, and in particular to systems and methods for designing reconfigurable integrated circuits.

The hardware industry has traditionally relied on Moore's law, the observation that the number of transistors on integrated circuits doubles approximately every two years, to pack more features in computing platforms every year. Each new generation of lithography has allowed more hardware to be fitted in a given die size (and therefore price point).

Fixed hardware solutions offer the best performance and lowest power consumption. However as we approach the end of Moore's law, we are beginning to see a slow-down in the shrinking of hardware from one generation to the next. This makes it desirable to share the same hardware for multiple tasks, and this has been a primary driver of reconfigurable hardware.

Various reconfigurable architectures have been proposed. There are also moves towards coarse-grained architectures in field-programmable gate arrays (FPGAs) and other reconfigurable designs in order to increase power efficiency and suitability for the mobile markets.

These designs may have heterogeneous cells but a common feature is a fixed homogenous interconnect system that is independent of the target applications. Although this enables the design to run a wide variety of applications, they also provide flexibility beyond what is needed if they are to be used for a specific family of applications. This increased flexibility comes at the cost of a circuit that is larger than necessary and an interconnect structure that is slower and more power-consuming than necessary.

Existing reconfigurable architectures are optimised manually to suit a family of applications, and this optimisation is typically only restricted to cell/node types, counts and their positions.

SUMMARY

Aspects of the present disclosure teach certain benefits in construction and use which give rise to the exemplary advantages described below.

According to a first aspect of the disclosure there is provided a method of generating a circuit design comprising receiving target data and training data; and generating a circuit design for implementing the target data and which is over-provisioned with respect to the target data according to the training data.

A circuit design for implementing the target data will be capable of implementing applications defined by the target data, but will not have flexibility beyond those applications. A circuit design that is over-provisioned with respect to target data will be able to implement the target data but may also give the circuit the capability to be modified to have additional capability.

Optionally, an objective function is received and said over-provisioned circuit design optimises the objective function.

Optionally, the method gathers statistics from the training data and determines added cell types and/or connection patterns which over-provision the circuit design with respect to the target data.

Optionally, the method comprises generating a circuit design for implementing the target data and then modifying that circuit design to derive the over-provisioned circuit design.

Optionally, the method comprises receiving one or more physical design constraints and where said generated circuit design is made to comply with the physical design constraints.

Optionally, the physical design constraints comprise one or more of the area, delay (speed), or power consumption of the circuit.

Optionally, the physical characteristics of different cells and different interconnects pre-calculated and stored, and used for ensuring said generated circuit design complies with the physical design constraints.

Optionally, the target data comprises netlists, and said netlists are merged to find a minimum number of nodes required to run the applications of the target data together with a corresponding interconnect layout, to provide a circuit design for implementing the target data.

Optionally, merging the netlist comprises inputting a first netlist and a second netlist, determining the smallest compound netlist that can implement both the input netlists; and repeating in cases where there are two or more netlists.

Optionally, determining the smallest compound netlist that can implement both the input netlists comprises computing a list of the unique node types that appear in both the input netlists, and counting the number of occurrences of each type.

Optionally, the number of nodes of a given type in the output netlist is set as the maximum number of occurrences that appears in the input netlists.

Optionally, the training data comprises a set of existing netlists that do not form part of the target data.

Optionally, nodes and edges are added to the circuit design for implementing the target data in order to generate the over-provisioned circuit design.

Optionally, optimising the objective function comprises scoring a candidate circuit design by examining the distribution of the nodes and edges in the candidate circuit design and comparing the distributions with the training data.

Optionally, a user can specify a node trade-off parameter for controlling the number of added nodes, adjustable between a first extreme where no additional nodes are added and a second extreme where the distribution of the nodes and edges in the candidate circuit design exactly matches the distribution of the nodes and edges in the training data.

Optionally, optimising the objective function comprises scoring a candidate circuit design by estimating a likelihood of the candidate circuit design being able to implement functions represented by the training data.

Optionally, nodes in the generated circuit design are placed to minimise the distance between those that lie on the critical paths of each target and training data.

Optionally, the nodes are placed according to an integer linear program, in which the variables being optimised are assignments of nodes to a position in a grid.

Optionally, placing the nodes comprises identifying the critical paths of each input netlist, minimising a distance between nodes for the netlist having the longest critical path; and repeating iteratively for successive netlists in decreasing order of critical path length.

Optionally, a number of the next longest paths in each application are calculated to check that the critical path before rearrangement is still the critical path; and the node placement is finalised if the critical path before rearrangement is still confirmed as the critical path.

Optionally, the number of the next longest paths is a user-adjustable parameter.

Optionally, the node placement process terminates after a set number of iterations.

Optionally, register nodes are formed as independent nodes in an array of the generated circuit design.

Optionally, register nodes are formed as integrated components of other logic nodes.

Optionally, the method comprises deciding whether to form one or more register nodes as either independent nodes in the array or as integrated components of other logic nodes.

Optionally, the generated circuit design comprises pipelined netlists.

Optionally, the pipelining is optimised by taking into account node positions and wire delays.

According to a second aspect of the disclosure there is provided a circuit design generator comprising means for receiving target data and training data; and means for generating a circuit design for implementing the target data and which is over-provisioned with respect to the target data according to the training data.

The circuit design generator may comprise means for carrying out any steps of the methods mentioned above.

According to a third aspect of the disclosure there is provided a computer program product comprising instructions that when executed by a computer cause it to function as the circuit design generator of the second aspect.

The computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fibre optic cable, twisted pair, digital subscriber line (DSL), or wireless technologies such as infra-red, radio, and microwave, then the coaxial cable, fibre optic cable, twisted pair, DSL, or wireless technologies such as infra-red, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

Other features and advantages of aspects of the present disclosure will become apparent from the following more detailed description, taken in conjunction with the accompanying drawings, which illustrate, by way of example, the principles of aspects of the disclosure.

BRIEF DESCRIPTION OF THE DRAWINGS

The disclosure will be described below, by way of example only, with reference to the accompanying drawings, in which.

The above described drawing figures illustrate aspects of the disclosure in at least one of its exemplary embodiments, which are further defined in detail in the following description. Features, elements, and aspects of the disclosure that are referenced by the same numerals in different figures represent the same, equivalent, or similar features, elements, or aspects, in accordance with one or more embodiments.

DETAILED DESCRIPTION

A reconfigurable circuit comprises logic cells which perform basic operations, internal memory cells known as registers and an interconnect layer that can be selectively configured to couple logic cells and/or memory registers with each other to create or perform various desired functionalities. The registers may be incorporated as part of the logic cells or may be provided as dedicated cells. It is also possible for register cells to be omitted altogether although this is rare in practical systems.

An application can be modelled as a graph in which case the cells (logic or register) may also be known as nodes and the connections between nodes, and between nodes and other circuit elements, are known as edges.

The logic cells comprise circuitry for performing basic operations, which are re-used as part of more specific or complex functionalities. A "fine-grained" reconfigurable circuit normally comprises one-bit primitive operations (look-up tables), whereas a "coarse-grained" circuit normally comprises primitive operations that operate on a larger bit-width (for example 16-bit arithmetic). Coarse-grained operations can be arbitrarily complex, for example a complete fast Fourier transform (FFT) or other custom accelerator, or can perform 32-bit multiplication or division or different shifting (shift left/right). Also, a reconfigurable circuit may comprise a mix of fine-grained and coarse-grained components.

The interconnect layer comprises a plurality of interconnects which are physical structures providing an electrical coupling between logic cells, registers and other circuit components. The interconnects may comprise crossbar or island style switches for example. Crossbar interconnects comprise a grid of conductors with a matrix of switches at their intersections that selectively short-circuit the conductors to connect one or many inputs to one or many outputs. Island interconnects comprise switch blocks and/or connection blocks amongst the logic cells which selectively couple conductors provided at the inputs and outputs of the switch blocks, connection blocks and logic cells.

The present disclosure provides a solution that allows a user to optimise the design of a reconfigurable circuit. The reconfigurable circuit may be a complete integrated circuit (also referred to as a chip), or a part thereof. The reconfigurable circuit could be an intellectual property (IP) block, being a circuit that can be used in a variety of different contexts and/or as part of larger chip designs.

Figure 1:
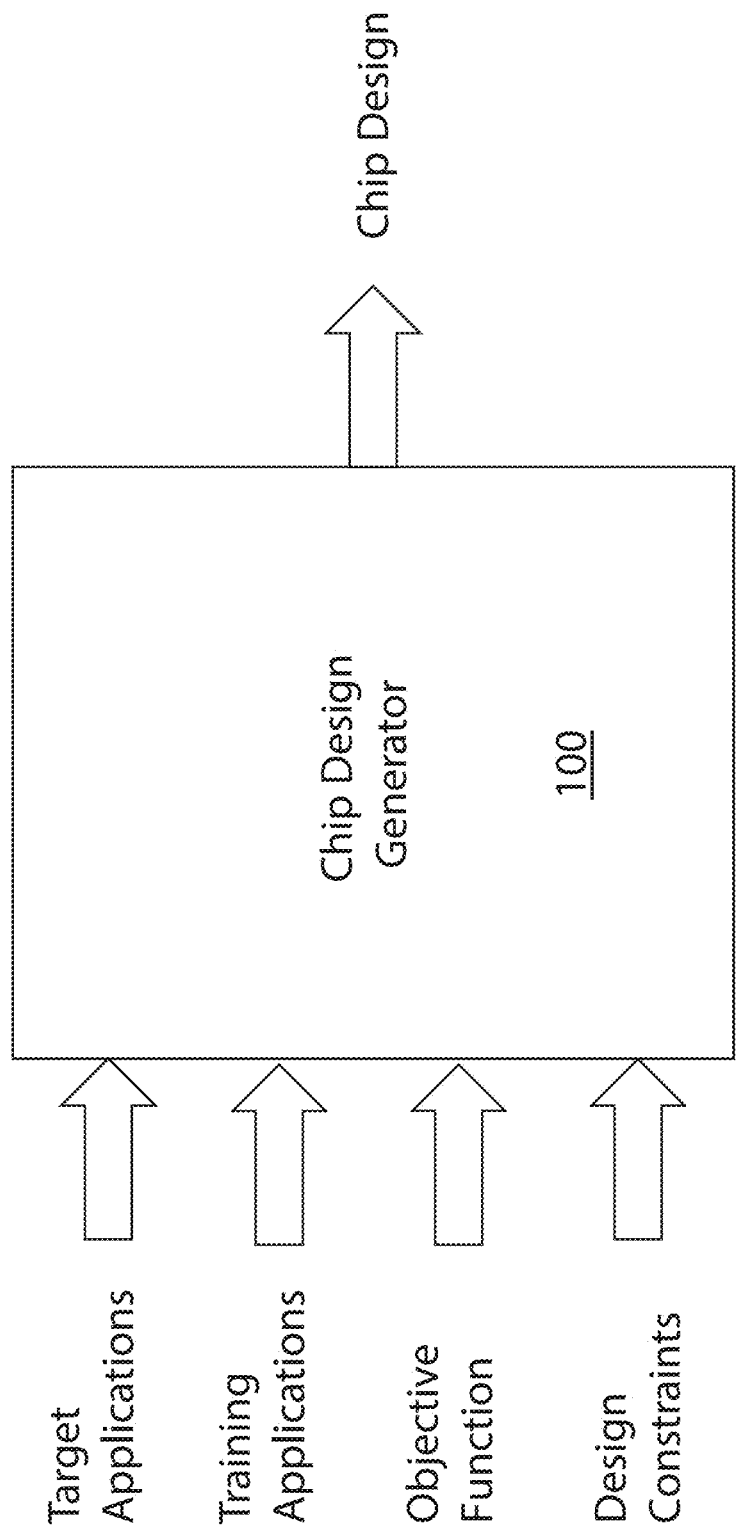
FIG. 1 shows a circuit design generator according to an embodiment of the disclosure.

FIG. 1 shows an overview of a circuit design generator 100 according to an embodiment of the disclosure. The generator 100 receives target applications, training applications, an objective function and optionally design constraints and processes them to output a circuit design that is optimised for a specific set of related applications.

The circuit design that the generator outputs comprises a description of an architecture for a circuit, including the cells it contains and how they are connected. The output may comprise a set of netlists in any suitable hardware description language, or a graphical representation. The output can be used by simulators to test the performance of a circuit made according to the design, or by synthesisers which can control circuit fabrication hardware to make a circuit according to the design. The circuit design may also be referred to as an architecture.

The user first inputs target data, which comprises a specification of one or more applications that the resulting circuit needs to run. The target data is analysed to determine a circuit design that is capable of running all the applications specified by the target data. This is referred to as a target-ready circuit.

The target data may comprise one or more netlists associated with the or each application, and analysing the target data may comprise merging the netlists to determine a minimum number of nodes required to run all the applications and a corresponding node and interconnect layout.

Graph-theoretical techniques may be used to merge the target data netlists. Each netlist can be represented by a directed graph—a set of vertices connected by edges, where the edges have a direction associated with them. Depending on the specific embodiment, the directed graph may either be acyclic or non-acylic. In an acyclic directed graph, each edge connects one vertex to another, such that there is no way to start at some vertex v and follow a sequence of edges that eventually loops back to v again. When a directed graph is not acyclic, it is possible to loop back to the same register cell. In cases where this is done, internal registers may be used to ensure that this loop back is not a combinatorial loop.

An algorithm for merging the netlists may comprise a sub-routine which we call GRAPH-SUM. The GRAPH-SUM sub-routine takes specifications of two netlists, A and B, as an input, and computes the smallest compound netlist, C, that is capable of implementing the input netlists. C is the graph with the smallest number of nodes and edges that contains both A and B as sub-graphs.

The GRAPH-SUM subroutine first computes a list of unique node types that appear in both A and B. For each unique node type t, it counts the number of occurrences of that type in the inputs. The number of nodes of type t required in output netlist C is precisely $t_C$=max($t_A$, $t_B$) of the counts in A and B, $t_A$ and $t_B$.

One means of representing directed graphs is via an adjacency matrix. Specifically, the adjacency matrix of a simple directed graph on n vertices is the n×n matrix in which the non-diagonal entry at position i, j is 1 if there exists an edge from vertex i to vertex j, and 0 otherwise. It is also possible to represent the directed graphs via an incidence matrix or by various other methods.

GRAPH-SUM proceeds by converting input netlists A and B into adjacency matrix form (matrix$_A$ and matrix$_B$). Once in this form, both matrices are padded with all-0 rows and columns such that they contain the same number of nodes of each type as C (calculated above). In other words, extra nodes are added to A and B's graphs to ensure that they contain as many nodes of each type as the compound netlist C. Note that at this stage these newly-added nodes are not connected to the remainder of the graph via edges.

The compound graph C with the smallest number of edges that contains A and B as sub-graphs is specified by adjacency matrix matrix$_C$=matrix$_A$|matrix$_B$, where | is the element-wise OR of the two adjacency matrices. This operation can be performed on the two matrices as they are both of the same size (after padding), and both contain only 0s or 1s.

Figure 2:
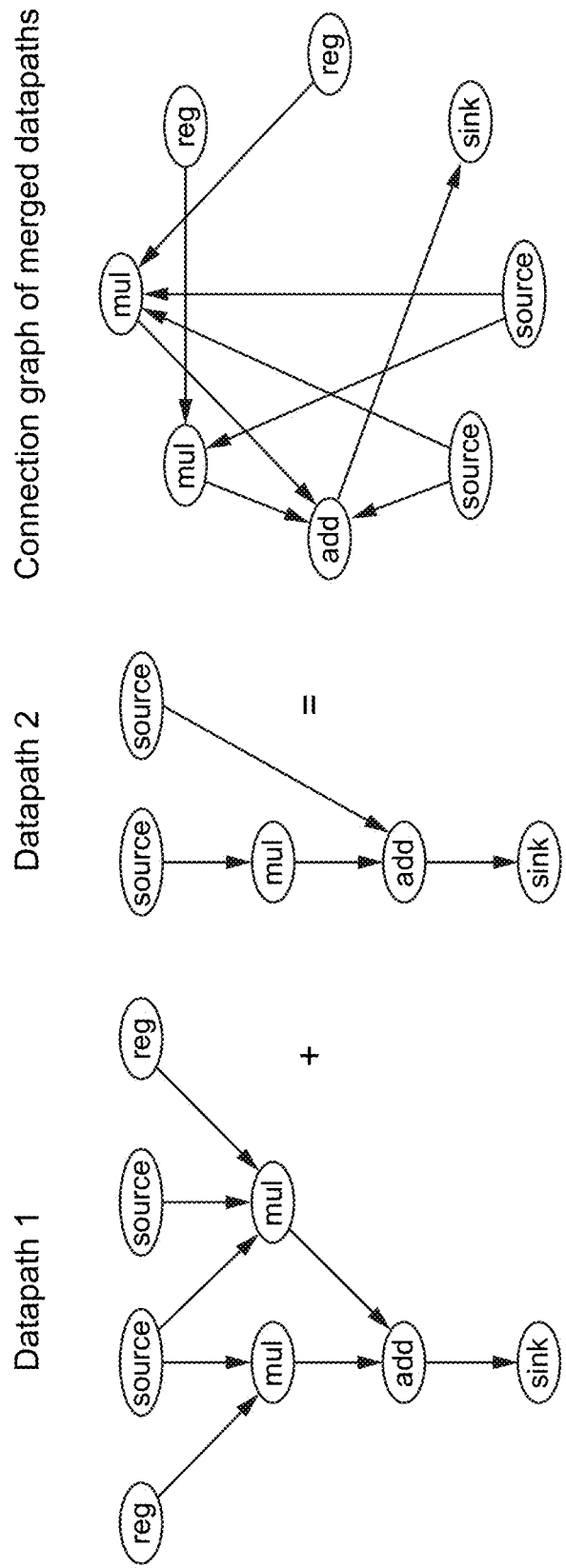
FIG. 2 shows an example of how two target netlists are merged, as part of a circuit design process according to an embodiment of the disclosure.

FIG. 2 shows an example of how two target netlists datapath 1 and datapath 2, are merged. The netlists are represented in the figure as graphs and the merged graph on the right hand side of the figure represents a target-ready circuit capable of running both applications (or components of applications) which are represented by datapath 1 and datapath 2.

In the figure, "source" denotes an input that is received from another (external) component; "reg" denotes a register; "mul" denotes a multiplication operation; "add" denotes an addition operation; "sink" denotes an output that is sent to another (external) component. An arrow with arrow head indicates a connection between components, with the arrowhead indicating the sequence of operation.

GRAPH-SUM is both associative and commutative. This allows us to compute the smallest netlist capable of implementing a collection of (more than two) input netlists by repeatedly applying the GRAPH-SUM routine. The result of this repeated application is an architecture referred to as the target-ready circuit, which can run all the applications specified by the target data.

The analysis of target data to obtain a target-ready circuit design was tested with three training netlists: an RGB (red-green-blue colourspace) to YUY2 (Y luminance and U chrominance colourspace) converter, a bilinear demosaicer, and a box blur image filter.

Figure 3:
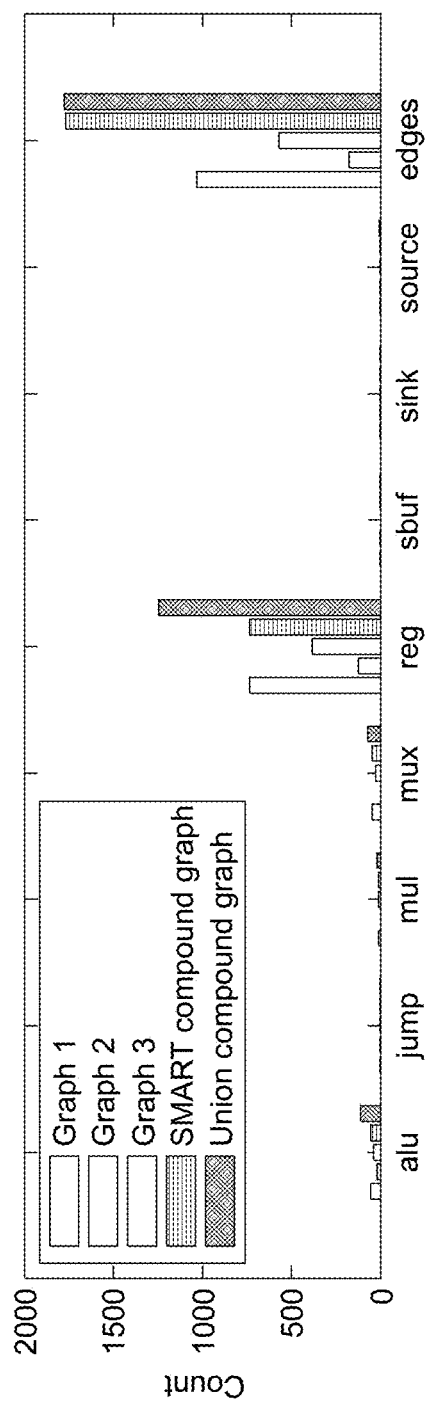
FIG. 3 shows a comparison of the merging of the netlists according to the process illustrated in FIG. 2 with the merging of the netlists by a union compound.
Figure 4:
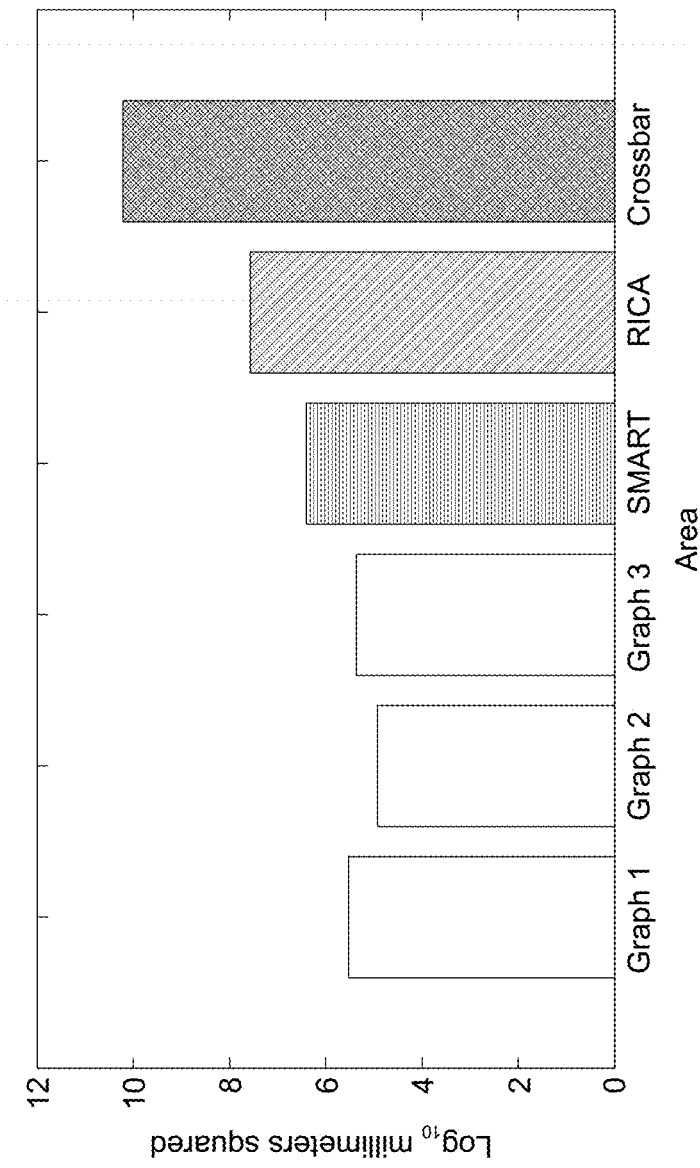
FIG. 4 shows a comparison of the area required to implement a set of netlists merged according to the process illustrated in FIG. 2 as compared with being merged according to other techniques.

FIGS. 3 and 4 illustrate a comparison of the merging of the netlists according to the disclosure with a baseline of a naive union compound where all target netlists are placed side by side in silicon. A comparison is also made with the smallest circuit capable of running the three netlists produced according to the methods taught in WO 2006/114642, referred to as RICA (reconfigurable instruction cell array) for convenience. The results are summarised in FIGS. 3 and 4. We observe that the graph according to the present disclosure implements the target netlists using significantly less space than both the union compound and RICA.

FIG. 3 shows node and edge counts. The target data are represented as graphs 1-3, and represent a bilinear demosaicer, a box blur image filter, and an RGB to YUY2 converter respectively. The figure shows the number of nodes and edges used by a compound graph according to the disclosure, referred to as a SMART compound graph, compared with a naive union of all target data. The SMART compound graph and the union compound graph are both able to execute all the target algorithms, however the SMART compound graph does so using fewer nodes.

FIG. 4 shows the area required to implement each of the three same target algorithms (again labelled as graphs 1-3) compared with that of the SMART compound graph, a RICA graph and a crossbar graph sufficiently large to implement the target algorithms. The SMART graph achieves this using significantly less space. Note the log scale on the y axis.

The target-ready circuit design represents an efficient design for running a minimum set of required applications. However the circuit design can be further improved according to the disclosure by designing an architecture that is over-provisioned compared to the target data (which represent the algorithms that the circuit must run), so that it is likely to also be able to run certain expected advancements in those applications over the near-term future. This may be known as a future-proof circuit.

One approach would be to add a large number of extra nodes and edges to the target-ready circuit design to increase the circuit's capacity. Alternatively, future algorithms can be predicted in order to intelligently over-provision the circuit architecture. It is impossible to predict the future with complete certainty. However, one sensible way of making predictions is to examine existing netlists that might be expected to run on the circuit in future years but are not currently in the target set. The training data may comprise this collection of netlists.

The training data comprises data such as a set of netlists which is intended to be used to improve a target-ready circuit (design) by making it more future-proof. The netlists may specify one or more applications or features that the resulting future-ready circuit should be able to run at some point in the future, or modifications to the applications or features that are specified by the target data. Training data may be chosen to be representative of aspects of algorithms that are most likely to increase in complexity.

It is the user's responsibility to choose these netlists to be representative of aspects of algorithms that are likely to be run on the circuit in the future. The generator goes through the training data and uses statistics gathered from this dataset to over-provision the circuit by adding cell types and connection patterns extracted from the training data. The objective function is the tool that the circuit designer uses to express the way in which the statistics of the training data affect the over provisioning of the circuit.

An objective function may be any quantitative measure of how future-proof a given circuit is. This objective function normally takes into account the training applications provided by the user. For example, the objective function could identify repeated units in a graph and make the assumption that algorithm families tend to advance by operating on larger regions of neighbouring data from one generation to the next, so these repeated units should be made more abundant. Similarly, the repeated unit itself may become more complicated, so availability of common operations that could be added to the chain would be a benefit for future readiness.

A user can also define one or more constraints that define mandatory characteristics of the resultant future-ready circuit. The constraints may be physical characteristics such as the area of the circuit, delay (speed), or power consumption.

Characteristics of individual nodes and different types and/or sizes of interconnects may be pre-calculated and stored in order to enforce the specified constraints. Storage may be provided via an appropriate memory forming part of the circuit design generator 100.

The future-ready circuit may be formed by modifying the design of the target-ready circuit according to the training data and any defined constraints. However in an alternative embodiment a future-ready circuit design can be generated directly from inputs comprising target data, training data and any constraints.

The objective function is then used to guide an optimisation routine, which adds nodes and/or edges to the target-ready circuit in order to increase the value of the objective function (i.e. to make the circuit more future-proof).

One suitable objective function which can be provided according to an embodiment of the disclosure comprises allocating a score to a circuit design by examining the distribution of the nodes and edges in the circuit (for example histograms of counts) and comparing these distributions to those observed in the training data. The more similar these distributions, the more future-proof that circuit is.

This can be referred to as a node-edge objective function, and an example of its implementation is illustrated with respect to FIGS. 5 to 8, with a training dataset that comprises five netlists (an epsilon filter, a manual filter and three multipass filters).

Figure 5:
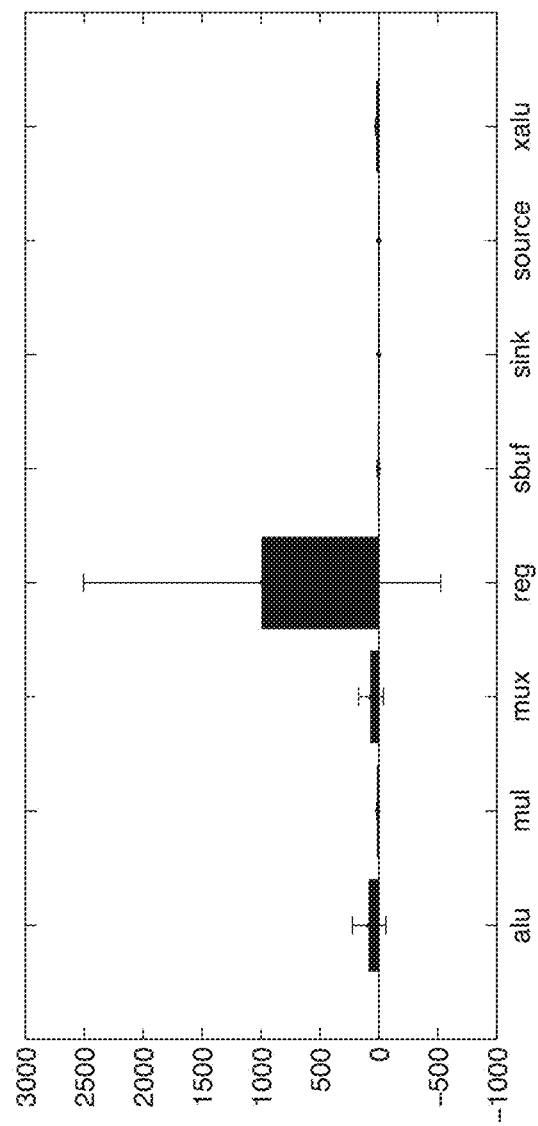
FIG. 5 shows an average number of nodes of different types which are encountered in a given set of training data which is used as part of a circuit design method according to an embodiment of the disclosure.

FIG. 5 shows the distribution of nodes in a training dataset. The figure shows the average number of nodes of each type encountered in the training data. Bars indicate one standard deviation and demonstrate the variability in the node counts. In the figure, ALU represents an arithmetic logic unit, mul represents a multiplier cell, mux represents a multiplexer cell, reg represents a register cell, sbuf represents a buffer cell (memory elements), sink represents a cell that allows data to be outputted to another (external) component, and source represents a cell that allows data to be inputted from another (external) component.

Figure 6:
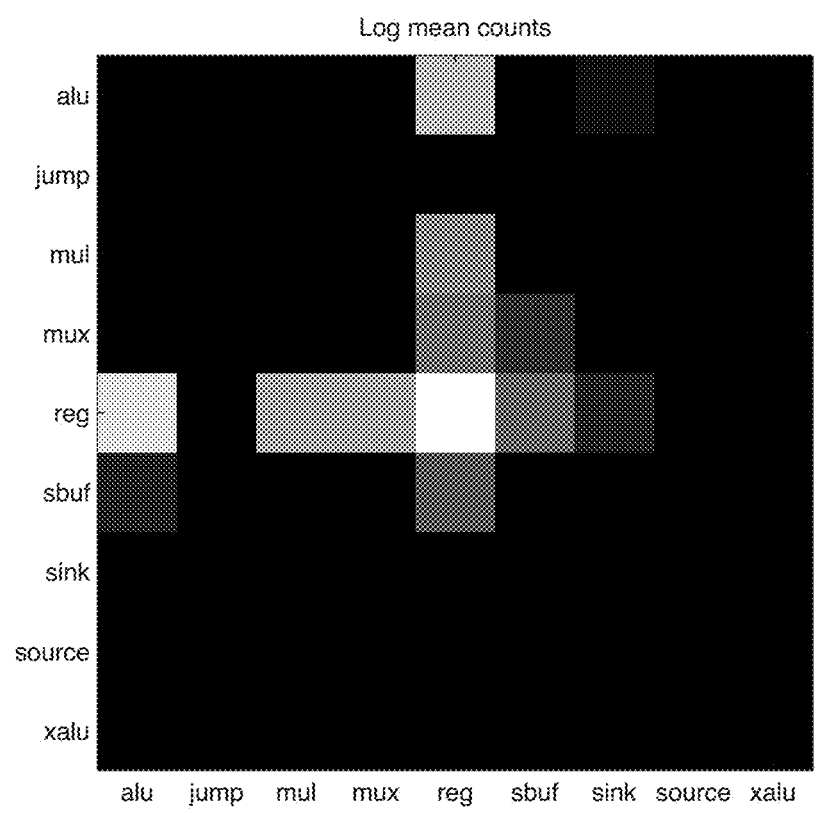
FIG. 6 shows node edges which are encountered in the same given set of training data from which the data of FIG. 5 is derived.

FIG. 6 shows the distribution of edges in the same dataset. The brightness of a cell in row i and column j is proportional to the log number of times an edge was observed between a node of type i and j in the training data.

The distribution of nodes and edges in the target-ready circuit will almost certainly be different. By adding a sufficient number of nodes and edges to the target-ready circuit, it will always be possible to match the distribution of nodes in the training data. We define a node trade-off parameter $0 \leq \alpha \leq 1$ that the user can adjust to control the number of added nodes and edges. At $\alpha=0$ no nodes or edges are added. At $\alpha=1$ sufficiently many nodes and edges are added to make the distributions match.

Figure 7:
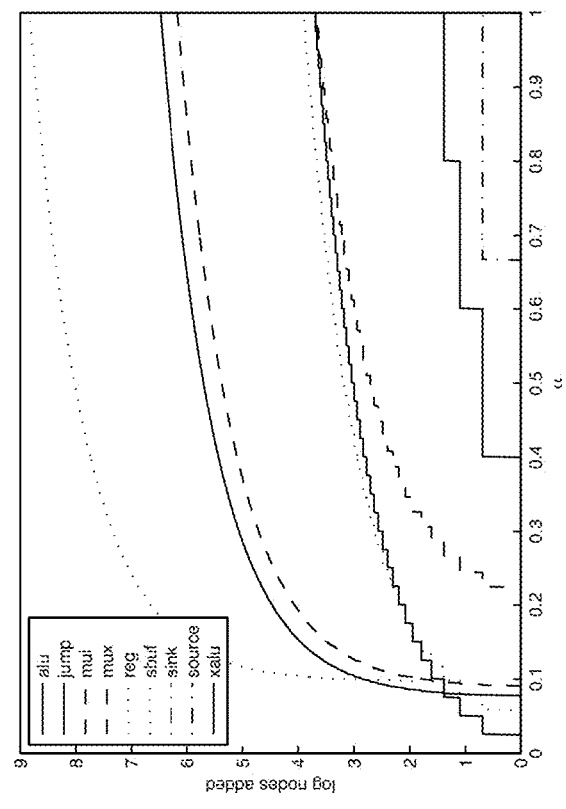
FIG. 7 shows a ratio of added nodes and their variation according to an optimisation parameter.
Figure 7:
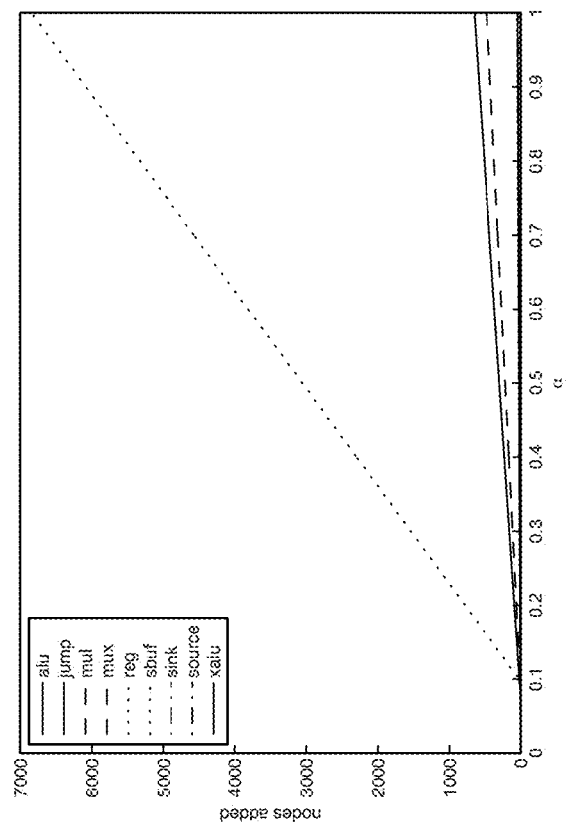

FIG. 7 plots the number of nodes of each type that are added to the graph as $\alpha$ is varied from 0 to 1. The plot on the left shows the number of nodes of each type that are added to the graph as $\alpha$ (on the x axis) varies from 0 to 1. At $\alpha=1$ the ratio of nodes of different types in the resulting graph matches that of the training graphs. The plot on the right is the same data but plotted on a log y-axis for clarity.

Figure 8:
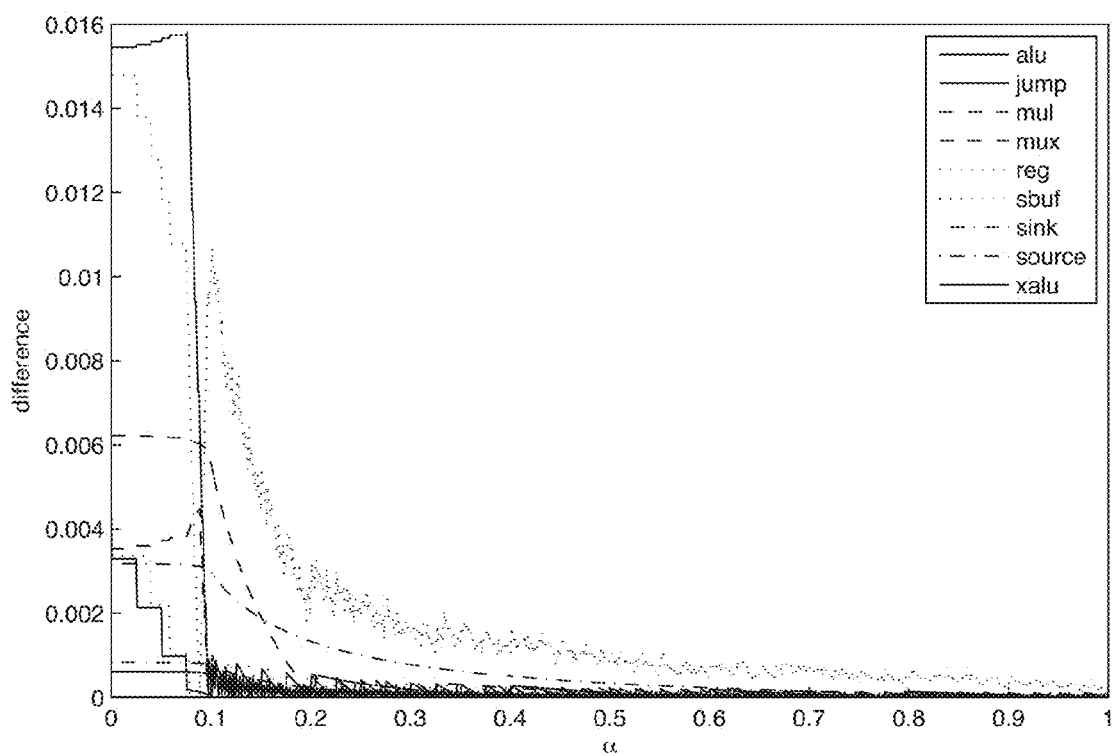
FIG. 8 shows a mismatch between the circuit's distribution of nodes and the training data distribution as a function of the optimisation parameter.

FIG. 8 shows the mismatch between the circuit's distributions and the training data distribution as a function of $\alpha$. The figure shows the difference in a current proportion, and that observed in the training data, for each node type, as a (on the x axis) varies from 0 to 1. At $\alpha=1$ the ratio of nodes of different types in the resulting graph (circuit design) matches that of the training data, and the difference is 0. It can be seen from this figure that a large portion of the distribution mismatch can be accounted for by an optimisation parameter that is as small as 0.1. At $\alpha=0.1$ we would only be adding 44 extra nodes to the circuit in our running example.

It is also possible to assign a score to a future-ready circuit via a model-based approach, in other words by estimating the likelihood of a future-ready circuit being able to implement the netlists given in the training data. This can be done by creating a probabilistic model of the training netlists, for example with the use of a probabilistic model of graph structure.

The initial placement of nodes on an underlying grid is typically arbitrary. It can either be done randomly, or via a more sophisticated approximation of the final layout objectives—for example bi-partitioning to minimise the spread of connections.

In addition, as an optional feature, a "layout objective function" may be used to optimise the layout and/or pipelining of the circuit. This may be a different objective function from the objective function that is optimised in the design of the future-ready circuit, which may also be referred to as a "circuit design objective function".

The layout objective function may be any quantitative measure of desired characteristics or parameters of a circuit layout or pipeline. It can be optimised without changing the value of the circuit design objective function. One example of a layout objective function is the critical path, being the delay of the longest path in a circuit. Optimising the critical path means that the path length and therefore delay is minimised.

In one embodiment, the critical paths of each input netlist are identified. The circuit design generator begins by optimising the critical path. Nodes are rearranged on the grid so as to minimise the distance between those that lie on the critical paths of each target and training applications. During this procedure more weight may be given to the target data over the training data, so that core functionality is always assured, while the target data functionality is also not compromised.

The circuit design generator starts with the netlist that has the longest critical path and minimises the distance between its nodes. It continues iteratively and in a decreasing order of critical path length with the other applications. Once this is done, the next n longest paths in each application are calculated to check that the critical path before rearrangement is still the critical path afterwards. If that is the case, the optimisation is complete. Otherwise, the process is repeated with the new critical path. The process continues until all critical paths are optimised or for a predetermined number of iterations. The number, n, of next longest paths which are checked in each application after the first pass can be set by a user and can be any value up to the entire number of paths. If they do not select a particular value for n it can be set at a default value. An example useful default value for n would be three, although of course other default values may be used.

More generally, this optimisation procedure can be formulated as an instance of an Integer Linear Program (ILP), where the variables being optimised over are the assignments of nodes to positions on a grid. Although ILP is in general NP-complete, the routine described above represents an efficient heuristic algorithm.

The output of the circuit design generator is a circuit design that implements the target applications, whilst maximising the objective function given the constraints and with a minimal area and cost overhead. This design will be more flexible than a normal ASIC, but less flexible than a normal FPGA. Its position on this spectrum of flexibility will depend on the parameters chosen by the designer.

Figure 9:
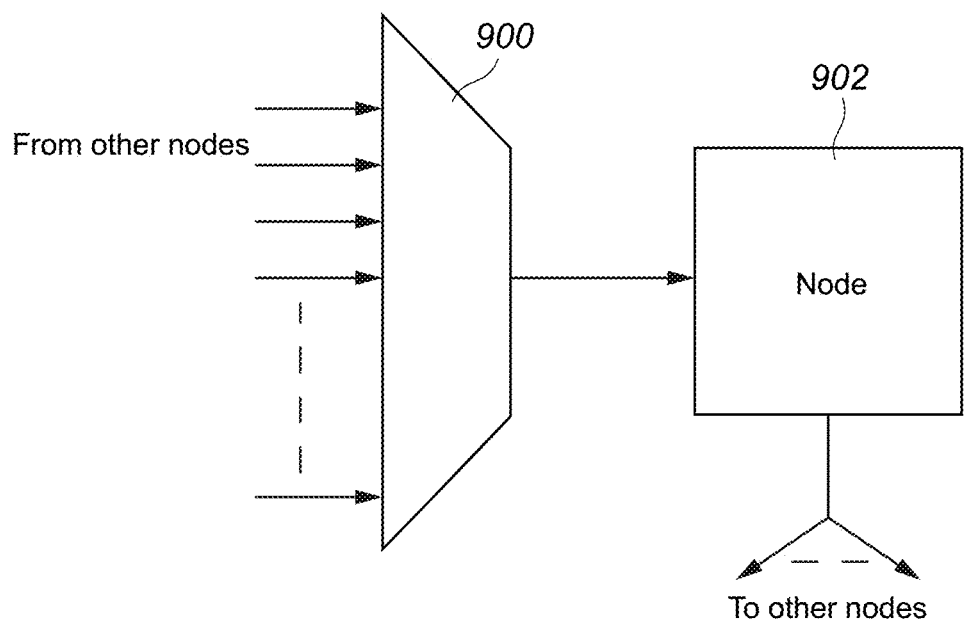
FIG. 9 shows a distribution of register cells in which the register cells are distributed in an array with each node having its own crossbar interconnect.

There are several options of how register cells can be distributed in an array generated by the circuit design generator. The register cells may be treated as any other cell and distributed in the array with each node having its own crossbar interconnect, as shown in FIG. 9. Here, a crossbar interconnect 900 comprising a multiplexer is provided at the edge of a node 902 which may be a register cell. The size of the multiplexer at the input of each node would depend on the number of other nodes in the array which are to be connected to that node.

Figure 10:
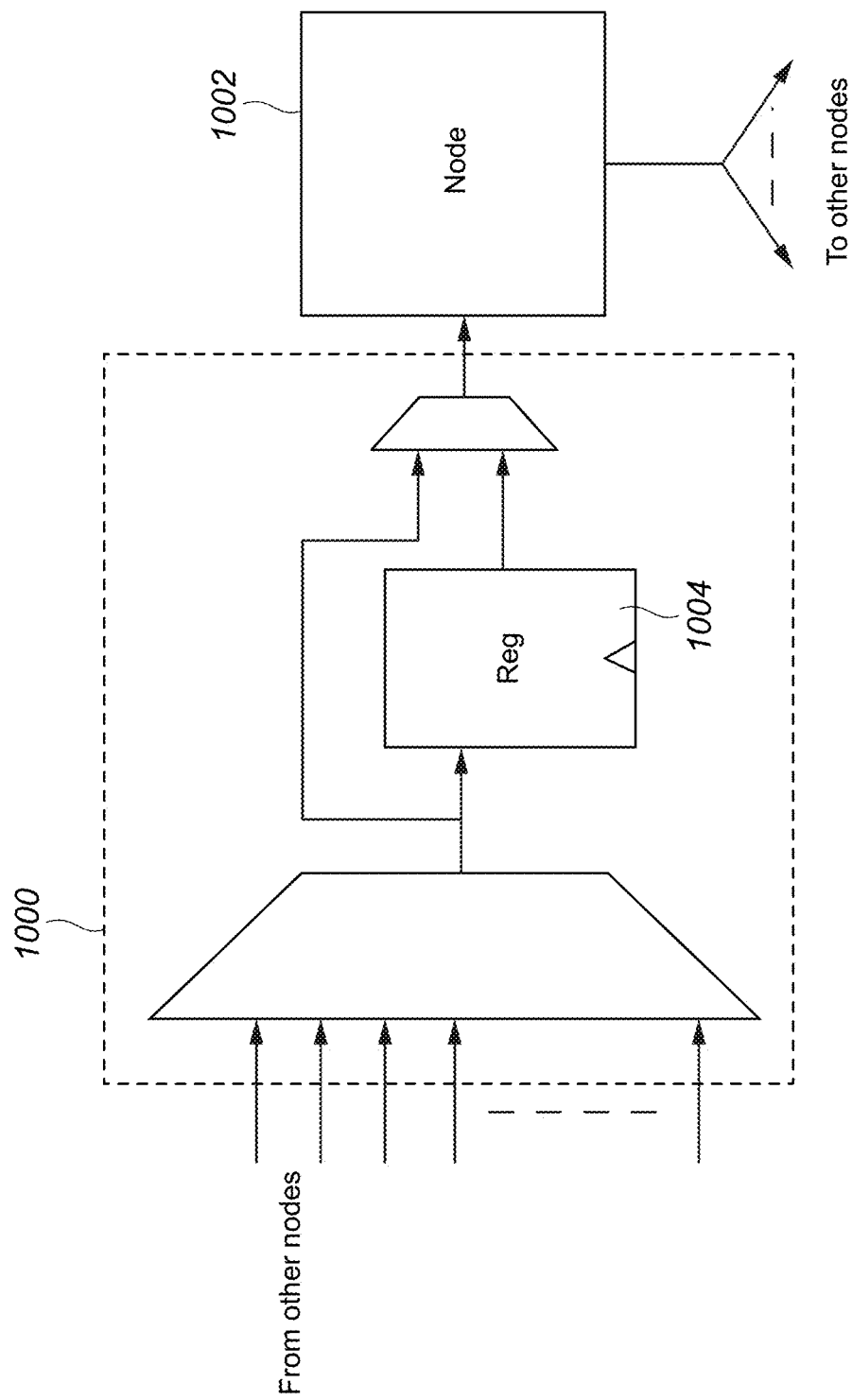
FIG. 10 shows a distribution of register cells in which the register cells are integrated into the interconnect of other larger nodes at the input of the node.
Figure 11:
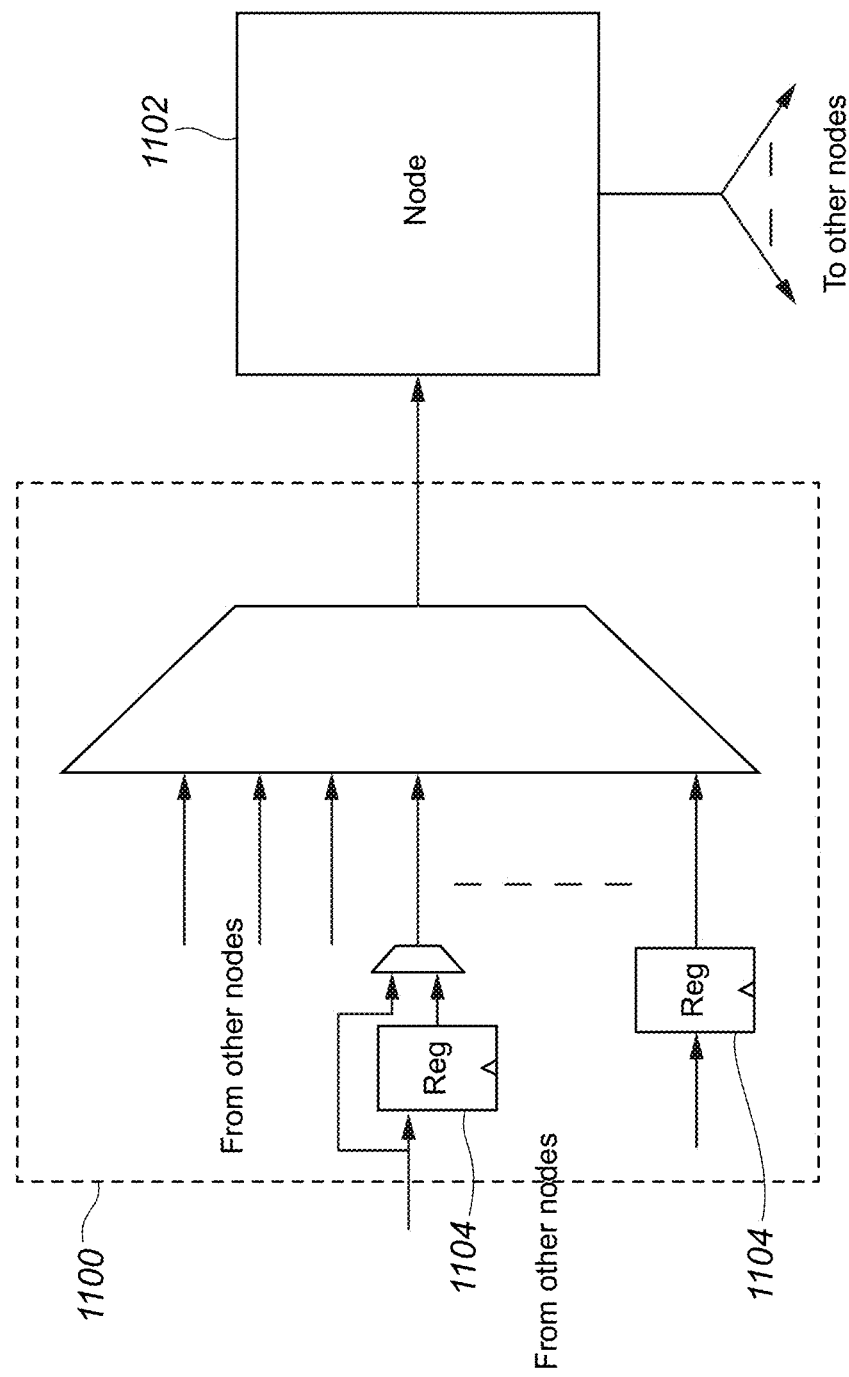
FIG. 11 shows a distribution of register cells in which the register cells are integrated into the interconnect of other larger nodes at inputs of the interconnect itself.

Alternatively, the register cells can be integrated into the interconnect of other larger nodes at the input of the node (as shown in FIG. 10) or at inputs of the interconnect itself (as shown in FIG. 11).

In the arrangement of FIG. 10, a crossbar interconnect 1000 is provided with an integrated register cell 1004 at an input of the node 1002. A register cell 1004 can be implemented within the interconnect of any node as such. Depending on the configuration of an application, the register cell 1004 may be selected to be within or not within the datapath.

In the arrangement of FIG. 11, a crossbar interconnect 1100 is provided with integrated register cells 1104 at interconnect inputs. The register cell or cells could be placed before the interconnect multiplexer. This could result in increased area due to possibly needing more register cells and their corresponding multiplexer and configuration bits. However, it would reduce the delay in the case where two non-register cells are to be connected directly. The circuit design generator can make a decision about which configuration to select depending on the main constraint.

Figure 12:
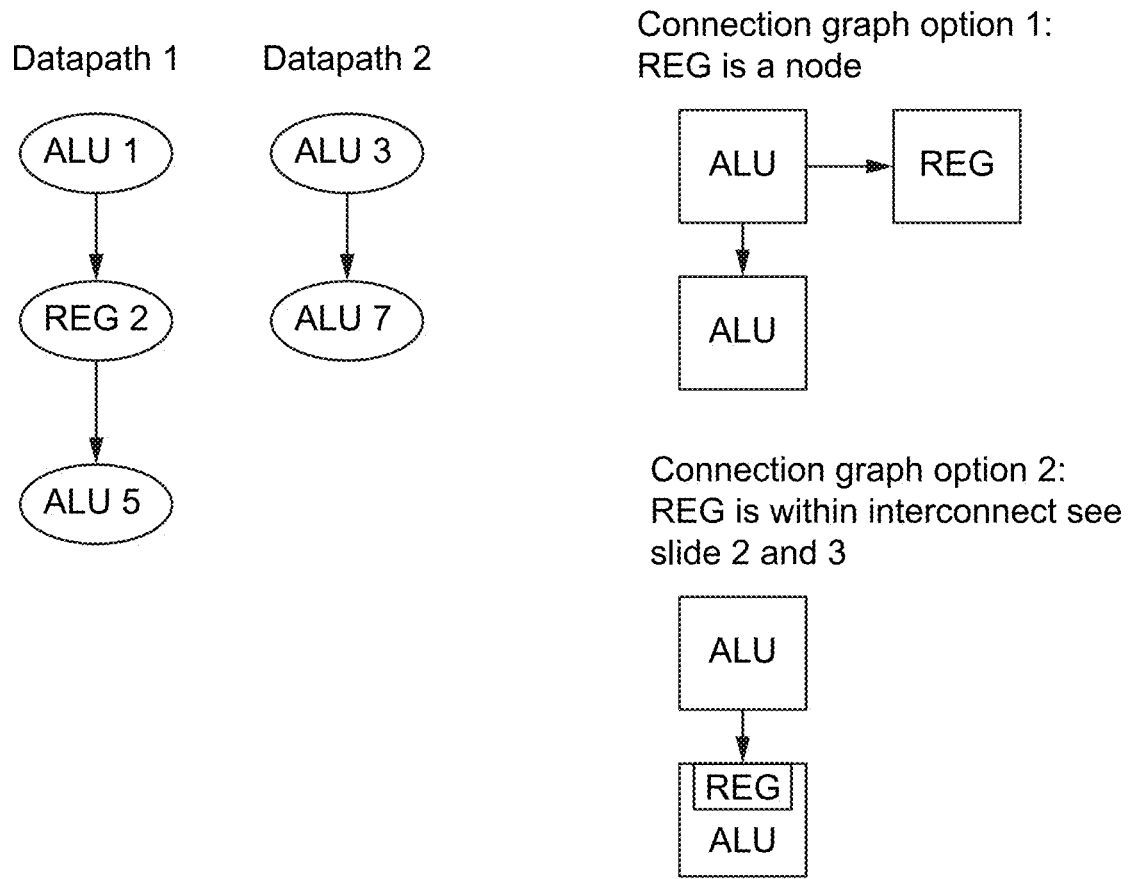
FIG. 12 shows the effect on a connection graph of using registers as independent nodes versus integrating them within the crossbar interconnect of other larger nodes.

FIG. 12 shows the effect on the connection graph of using registers as independent nodes versus integrating them within the crossbar interconnect of other larger nodes. The circuit design generator can provide a user with the option to allow integrating small nodes such as register cells (and other cells the user labels to be small) into other larger nodes.

FIG. 12 illustrates how two datapaths from two different sets of training data can be merged. According to a first option, each node in the datapath is treated as a separate cell with its own interconnect built around it which allows it to connect to any number of other nodes. As a result, the connection graph shows three nodes with two types (arithmetic logic unit (alu) and register (reg) and the connections between them which would allow both input datapaths to be executed depending on the interconnect configuration.

According to a second option, small node integration is turned on. Only two nodes are generated and a register cell (reg) is integrated within one of the nodes. The result is an array with reduced area and delay, which still allows both input datapaths to be executed.

Pipelining of configuration contexts that persist for many iterations (termed 'kernels') takes place at the compiler level. The compiled target and training netlists may have provisions for pipeline registers and the circuit design generator may use that data to generate a circuit where the target netlists will be pipelined.

The circuit design generator may optimise the pipelining by taking into account node positions and wire delays. This method is best suited when using individual registers as separate nodes in the circuit's array.

Figure 13:
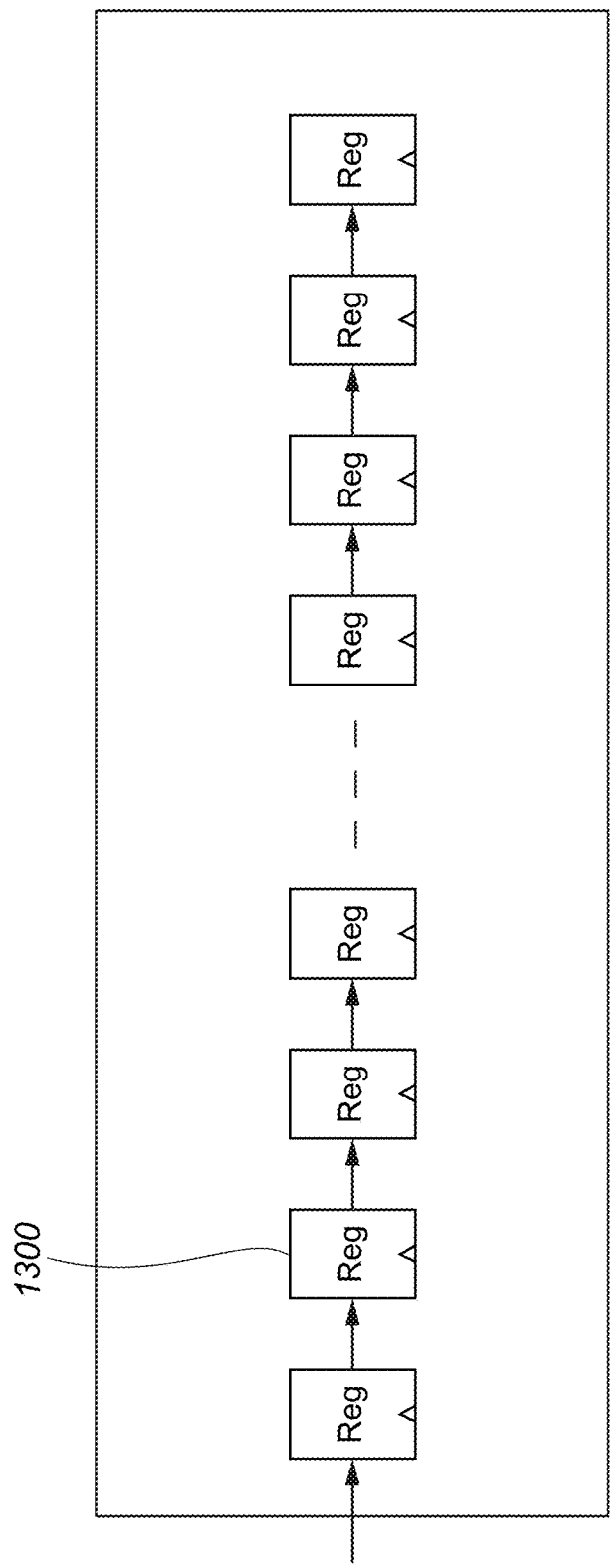
FIG. 13 shows register nodes that are connected in series to form a chain that is present in pipelined datapaths of certain applications.

FIG. 13 shows register nodes 1300 that are connected in series to form a chain that is present in pipelined datapaths of certain applications. The circuit design generator may create one or more first in first out (FIFO) cells to allow that datapath to be implemented on the Future-Ready array. The FIFO cell can have several outputs taken from the different levels that need to be taken to. The decision of how many FIFO cells to make, namely whether to tend towards having many small FIFO nodes or to tend towards having one or few large FIFO nodes, depends on the constraints set by the user.

Several variations are constructed and the best option that can also be optimised to the constraints will be selected. If delay is to be optimised, several options are selected and after the last stage, where cells are moved to minimise the distance between them is made, the best option is selected.

Figure 14:
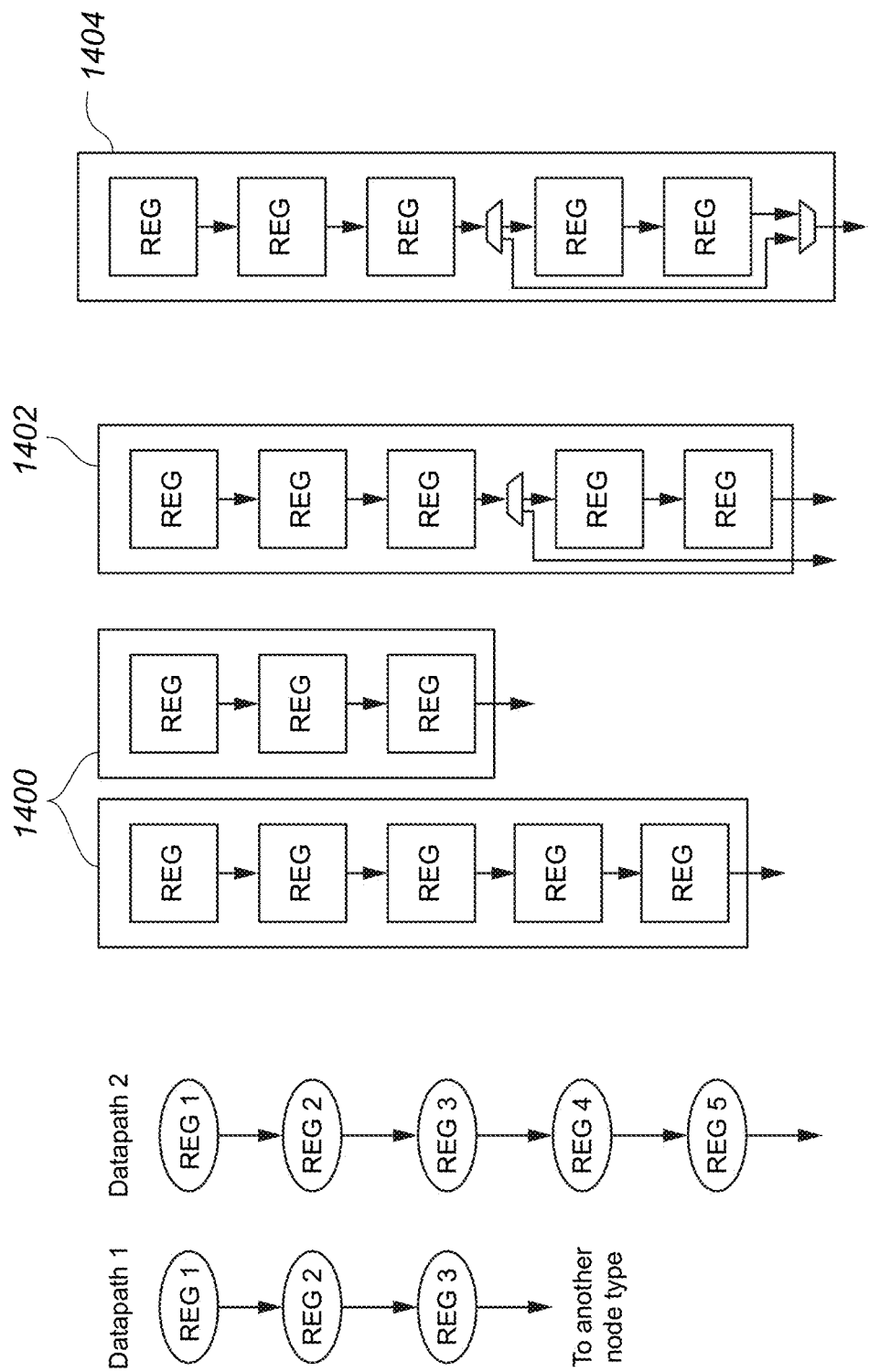
FIG. 14 shows several ways of dealing with long register chains used in pipelined datapaths.

There are several ways the circuit design generator may deal with long register chains used in pipelined datapaths. Some are illustrated in FIG. 14, which shows connection options for two example datapaths shown in FIG. 14—datapath 1 which comprises a chain of three register cells, and datapath 2 which comprises a chain of five register cells.

In a first implementation option, each register may be treated like any other node type, that is, as a separate node with its own crossbar interconnect.

In a second implementation option, the registers may be integrated with other cells. This is possible for small chains of registers (say, fewer than three) but becomes impractical for larger chains. The user has the option of defining a maximum number of registers in a chain that are allowed to be integrated into a cell.

In a third implementation option (1400 in FIG. 14), each chain of registers is grouped into a larger node. This may be a FIFO which has its own crossbar interconnect multiplexer at its input.

In a fourth implementation option (1402 in FIG. 14), the two datapaths may be merged into one programmable FIFO with multiple outputs. Each output from the programmable FIFO would be connected to the respective node depending on the input datapaths.

In a fifth implementation option (1404 in FIG. 14), each chain of registers is grouped into a larger node as in the fourth implementation option, but additional hardware is provided to limit the programmable FIFO to only one output.

The circuit design generator may choose the option or options that would best achieve the constraints. For example, the user can put a limit on the number of fan-out from any given node. This would favour the fifth implementation option over the fourth implementation option. The user can also activate or deactivate an option.

Various modifications and improvements can be made to the above without departing from the scope of the disclosure.

For example, the circuit design generator may use a compiler that compiles applications onto a coarse-grained fabric and generates interconnects based on the crossbar system. However it can also be adapted to work with other compilers to allow for fine-grained cells and also to allow for the use of other interconnect schemes such as island-based interconnects.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

The methods as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The invention claimed is:

1. A computer-implemented method of generating a circuit design comprising:
    receiving target data comprising a specification of a target application, the target data comprising netlists associated with one or more target applications;
    receiving training data comprising a specification of a training application or a training feature, or comprising a modification to the target data;
    generating a circuit design for implementing the target application, wherein the circuit design comprises nodes and interconnects and is over-provisioned with respect to the target data according to the training data; and
    merging the netlists to find a minimum number of nodes required to run the target applications of the target data and to provide a corresponding node and interconnect layout, thereby generating the circuit design for implementing the target applications.

2. The method of claim 1, wherein an objective function is received, the objective function expressing how the training data affects over-provisioning of the circuit design, and the over-provisioned circuit design optimises the objective function.

3. The method of claim 1, wherein the training data comprises one or more cell types or one or more connection patterns, further comprising gathering statistics from the training data and determining added cell types or connection patterns which over-provision the circuit design with respect to the target data.

4. The method of claim 1, comprising generating a target-ready circuit design for implementing the target application and then modifying the target-ready circuit design to generate the over-provisioned circuit design.

5. The method of claim 4, wherein the target-ready circuit design and the over-provisioned circuit design both comprise nodes and edges, wherein nodes and edges are added to the target-ready circuit design for implementing the target application in order to generate the over-provisioned circuit design.

6. The method of claim 5, comprising providing a node trade-off parameter for controlling the number of added nodes, the node trade-off parameter being adjustable between a first extreme where no nodes are added to the target-ready circuit design and a second extreme where a distribution of the nodes and edges in the over-provisioned circuit design matches a distribution of the nodes and edges in the training data.

7. The method of claim 1, comprising receiving one or more physical design constraints and where the generated circuit design is made to comply with the physical design constraints, wherein the physical design constraints comprise one or more of an area, a delay (speed), or power consumption of the circuit design.

8. The method of claim 7, wherein the circuit design further comprises cells and is made to comply with the physical design constraints by pre-calculating and storing characteristics of different cells and different interconnects, the method further comprising using the characteristics to ensure the generated circuit design complies with the physical design constraints.

9. The method of claim 1, wherein merging the netlists comprises inputting a first netlist and a second netlist, determining a smallest compound netlist that can implement both the first and second netlists, wherein the smallest compound netlist has the minimum number of nodes and interconnects required to implement both the first and second netlists, and repeating the step of merging the netlists in cases where there are more than two netlists.

10. The method of claim 1, wherein the circuit design comprises nodes arranged on a grid, each of the target data and the training data comprise a critical path, and the nodes in the generated circuit design are rearranged on the grid to minimise the distance between those that lie on the critical paths of each target and training data.

11. The method of claim 10, wherein the nodes are placed according to an integer linear program comprising optimisation over arrangements of nodes on the grid.

12. The method of claim 10, wherein rearranging the nodes comprises identifying critical paths of netlists associated with one or more target applications, where each critical path has an associated path length, the method further comprising minimising a distance between nodes for the netlist having the longest critical path and repeating iteratively for successive netlists in decreasing order of path length.

13. The method of claim 12, wherein rearranging the nodes further comprises calculating one or more next longest paths in each target and training application to check that the critical path before rearrangement is still the critical path afterwards, wherein the next longest path is a path length shorter than the critical path prior to rearrangement, and finalising the node arrangement if the critical path before rearrangement is still confirmed as the critical path.

14. The method of claim 1, wherein the circuit design comprises nodes, wherein the nodes comprise logic nodes and register nodes, wherein the register nodes are distributed as independent nodes in an array of the generated circuit design or are integrated components of the logic nodes.

15. The method of claim 1, wherein the target data comprises target netlists, the training data comprises training netlists, and the generated circuit design comprises pipelined netlists.

16. A computer-implemented circuit design generator arranged to receive target data comprising a specification of a target application, the target data comprising netlists associated with one or more target applications, to receive training data comprising a specification of a training application or a training feature, or comprising a modification to the target data, to generate a circuit design for implementing the target application, wherein the circuit design comprises nodes and interconnects and is over-provisioned with respect to the target data according to the training data, and to merge the netlists to find a minimum number of nodes required to run the target applications of the target data and to provide a corresponding node and interconnect layout, thereby generating the circuit design for implementing the target applications.

17. The circuit design generator of claim 16 implemented in a computer program product comprising instructions that when executed by a computer cause it to function as the circuit design generator.

18. A circuit design generated by a process comprising:
receiving target data comprising a specification of a target application, the target data comprising netlists associated with one or more target applications;
receiving training data comprising a specification of a training application or a training feature, or comprising a modification to the target data;
generating a circuit design for implementing the target application, wherein the circuit design comprises nodes and interconnects and is over-provisioned with respect to the target data according to the training data; and
merging the netlists to find a minimum number of nodes required to run the target applications of the target data and to provide a corresponding node and interconnect layout, thereby generating the circuit design for implementing the target applications.

19. The circuit design of claim 18, the process further comprising generating a target-ready circuit design for implementing the target application and then modifying the target-ready circuit design to generate the over-provisioned circuit design, wherein the target-ready circuit design and the over-provisioned circuit design both comprise nodes and edges, further wherein nodes and edges are added to the target-ready circuit design for implementing the target application in order to generate the over-provisioned circuit design.

20. The circuit design of claim 18, comprising nodes arranged on a grid, each of the target data and the training data comprising a critical path, and the nodes in the generated circuit design are rearranged on the grid to minimise the distance between those that lie on the critical paths of each target and training data.

* * * * *